US011285062B2

(12) United States Patent
Wu

(10) Patent No.: US 11,285,062 B2
(45) Date of Patent: Mar. 29, 2022

(54) LINEAR ACTUATOR WITH BUFFERING MECHANISM

(71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 581 days.

(21) Appl. No.: 16/413,573

(22) Filed: May 15, 2019

(65) Prior Publication Data

US 2020/0008991 A1 Jan. 9, 2020

Related U.S. Application Data

(60) Provisional application No. 62/694,875, filed on Jul. 6, 2018.

(51) Int. Cl.
*A61G 7/018* (2006.01)
*H02K 7/06* (2006.01)
(Continued)

(52) U.S. Cl.
CPC ............ *A61G 7/018* (2013.01); *A61G 7/015* (2013.01); *F16F 9/103* (2013.01); *F16H 25/20* (2013.01);
(Continued)

(58) Field of Classification Search
CPC ......... A61G 7/018; A61G 7/015; F16F 9/103; F16H 25/20; F16H 2025/2071; F16H 2025/209; H02K 7/06; H02K 7/1166
See application file for complete search history.

(56) References Cited

U.S. PATENT DOCUMENTS 2,418,351 A * 4/1947 Jackson .................. H02K 7/06 192/142 R
2,660,027 A * 11/1953 Geyer .................... F15B 13/10 92/24

(Continued)

FOREIGN PATENT DOCUMENTS

CN 100552263 C 10/2009
CN 206904094 U 1/2018

(Continued)

OTHER PUBLICATIONS

Office Action dated Jan. 15, 2020 of the corresponding Danish patent application No. PA201970371.

*Primary Examiner* — David M Fenstermacher
(74) *Attorney, Agent, or Firm* — Chun-Ming Shih; HDLS IPR Services

(57) ABSTRACT

A linear actuator (1) with a buffering mechanism includes an actuator main body (10), a quick release mechanism (30) and a buffering member (50). The actuator main body (10) includes a housing base (11), an outer tube (14) connected to the housing base (11) and an extendable tube (15) penetrating into the outer tube (14). The quick release mechanism (30) is installed on the actuator main body (10). The buffering member (50) is arranged at one side of the outer tube (14). One end of the buffering member (50) is connected to the outer tube (14) or the housing base (11), and another end of the buffering member (50) is connected to the extendable tube (15). Accordingly, the impact force generated during the rapid retraction of the extendable tube can be reduced.

20 Claims, 19 Drawing Sheets

1

112 351 30 70 111 11 141 10 14 54 53 15 75 51 553 152 50 511 551 52 552

(51) Int. Cl.

| | |
|---|---|
| ***H02K 7/116*** | (2006.01) |
| ***A61G 7/015*** | (2006.01) |
| ***F16F 9/10*** | (2006.01) |
| ***F16H 25/20*** | (2006.01) |

(52) U.S. Cl.

CPC ............. *H02K 7/06* (2013.01); *H02K 7/1166* (2013.01); *F16H 2025/209* (2013.01); *F16H 2025/2071* (2013.01)

(56) References Cited

U.S. PATENT DOCUMENTS

| | | | | |
|---|---|---|---|---|
| 3,581,625 | A * | 6/1971 | Michalak | F15B 15/261 92/24 |
| 4,000,664 | A * | 1/1977 | Christensen | F16H 25/2204 74/89.44 |
| 5,002,172 | A * | 3/1991 | Stringer | B64D 11/064 192/142 R |
| 5,461,935 | A * | 10/1995 | Hill | F16H 25/2015 74/89.37 |
| 6,259,175 | B1 * | 7/2001 | Alfano | F16H 25/2021 310/20 |
| 8,413,532 | B2 * | 4/2013 | Wu | H02K 11/21 74/424.78 |
| 9,228,647 | B2 * | 1/2016 | Wu | F16H 25/20 |
| 9,772,013 | B2 * | 9/2017 | Tsai | F16H 25/20 |
| 9,828,792 | B2 * | 11/2017 | Bendel | H02K 7/06 |
| 10,516,318 | B2 * | 12/2019 | Iversen | F16H 25/20 |
| 2005/0160846 | A1 * | 7/2005 | Chiang | H02K 7/06 74/89.35 |
| 2007/0144279 | A1 * | 6/2007 | Wu | H02K 7/06 74/22 A |
| 2008/0210029 | A1 * | 9/2008 | Wang | F16H 25/20 74/89.38 |
| 2011/0304231 | A1 | 12/2011 | Wu | |
| 2012/0256146 | A1 | 10/2012 | Arnold et al. | |
| 2014/0326089 | A1 | 11/2014 | Wu | |
| 2014/0345404 | A1 * | 11/2014 | Wu | F16D 11/10 74/405 |
| 2015/0377329 | A1 | 12/2015 | Wu | |
| 2017/0331350 | A1 | 11/2017 | Sørensen et al. | |
| 2018/0161225 | A1 | 6/2018 | Zerhusen et al. | |
| 2022/0025679 | A1 * | 1/2022 | Distefano | F16H 25/20 |

FOREIGN PATENT DOCUMENTS

| | | |
|---|---|---|
| TW | M275836 U | 9/2005 |
| TW | M539858 U | 4/2017 |

* cited by examiner 17
31
311
321
32
33
18
16
13
342
341
34
343

1A
111
112
70
30
54
353
51
50
14
10
52
15
55
551
75

LINEAR ACTUATOR WITH BUFFERING MECHANISM

BACKGROUND OF THE INVENTION

Field of the Invention

The technical field relates to a linear actuator, in particular, to a linear actuator with a buffering mechanism.

Description of Related Art

Linear actuators are used in various fields and are installed on electric beds, treadmills or wheelchairs etc. in order to provide the function of adjustment of inclination angle and elevation of devices, which have been widely applied and accepted by the general public.

A linear actuator mainly comprises a motor, a transmission mechanism and a quick release mechanism. The motor includes a worm shaft. The transmission mechanism comprises a lead screw and a worm gear engaging with the aforementioned worm shaft for transmission. The motor drives the worm shaft to rotate in order to further drive the worm gear and the worm shaft to rotate, thereby allowing the inner tube of the linear actuator to extend or retract in length; consequently, it is able to achieve the objective of adjusting an inclination angle or an elevation height. In addition, when a linear actuator is applied to an electric bed, to cope with the occurrence of emergencies, a quick release mechanism is further installed. Through the use of a quick release mechanism, the inner tube of the actuator can be retracted rapidly, such that the electric bed can achieve fast adjustment change in order to shorten the valuable time for emergency treatment.

Chinese Patent Publication No. CN206904094U discloses an electric push rod quick release apparatus, and the quick release apparatus is installed between a speed reducer and a lead screw. Therefore, when there is a need to use the push rod for quick release, a user can pull from the external to trigger a pull rod in order to realize the coupling disconnection effect and, consequently, quick release can be achieved.

In addition, Taiwanese Patent Publication No. TWM275836 also discloses a quick release structure for a bed actuator, and a pressing rod is arranged between a lead screw and a worm gear. To perform quick release, the pressing rod can be triggered to disengage the worm gear from the lead screw, such that when the lead screw is under the resistance free state, the extendable shaft can be rotated downward swiftly.

Furthermore, Chinese Patent Publication No. CN100552263C also discloses a linear actuator, and its quick release mechanism comprises two cylindrical coupling members. One of the cylindrical coupling members is attached onto a lead screw to rotate together therewith, and the other cylindrical coupling member is attached onto the worm gear to rotate together therewith. A torque transmission unit is arranged at the corresponding end of each cylindrical coupling member, and the engagement/disengagement between the cylindrical coupling members can be utilized in order to allow the lead screw or the worm gear to be rotated together for transmission or to be disengaged from transmission.

Nevertheless, during the process of quick release, since a specific portion of a hospital bed falls downward rapidly, the impact generated from such sudden fall is extremely likely to cause second injury to a patient. Therefore, the question on how to provide a buffering mechanism during such rapid fall of mechanical parts and before the stop of such fall is one of the main objectives of the present invention.

Moreover, Taiwanese Patent Publication No. TWM539858 discloses and adjustable easy-lifting type bed. As the bottom portion of the bed board is installed with a pneumatic rod, when the bed board descends for closing, the bed board utilizes the weight of the mattress for descending, and the pneumatic rod provides the buffer in order to allow the bed board to descend slowly until it is closed onto the base of the bed throughout the process.

However, for a known application of using a pneumatic rod on a hospital bed, a pneumatic rod is further installed at a portion of the hospital bed in order to provide the buffering function. The traditional installation method of the pneumatic rod is to install it at the bed frame in order to provide the buffer. As a result, such hospital bed is required to install not only an actuator but also a pneumatic rod, causing the installation procedure to be complicated, and the structure of the hospital bed also becomes complicated along with the increase of manufacturing cost.

SUMMARY OF THE INVENTION

An objective of the present invention is to provide a linear actuator with a buffering mechanism, which is able to utilize the installation of a buffering member to reduce the impact force of an extendable tube during rapid retraction thereof.

To achieve the aforementioned objective, the present invention provides a linear actuator with a buffering mechanism, installed on a nursing bed, the nursing bed having a first end, a second end and a bed frame arranged between the first end and the second end, the bed frame having an adjustable portion, the linear actuator comprising an actuator main body, a quick release mechanism and a buffering member. The actuator main body comprises a housing base, a driving mechanism and a transmission mechanism. The driving mechanism is arranged inside the housing base. The transmission mechanism comprises an outer tube connected to the housing base and an extendable tube inserted into the outer tube. The driving mechanism drives the transmission mechanism to allow the extendable tube to perform extension and retraction movements relative to the outer tube. The quick release mechanism is installed on the actuator main body. The quick release mechanism comprises a positioning wheel and a clutch wheel. The clutch wheel includes a plurality of key receiving slots arranged on one side thereof. The positioning wheel includes a plurality of protruding keys arranged at an outer perimeter thereof. Each one of the protruding keys is configured to be inserted into each one of the key receiving slots, thereby allowing the clutch wheel to be operably disengaged from or engaged with the positioning wheel correspondingly.

The buffering member is arranged at one side of the outer tube. One end of the buffering member is connected to outer tube, and the other end thereof is connected extendable tube.

To achieve the aforementioned objective, the present invention provides a linear actuator with a buffering mechanism comprising an actuator main body, a quick release mechanism and a buffering mechanism. The actuator main body comprises a housing base, an outer tube connected to the housing base and an extendable tube penetrating into the outer tube and capable of moving relative to the outer tube. The quick release mechanism is installed on the actuator main body. The buffering member is arranged on one side of the outer tube. One end of the buffering mechanism is connected to the housing baes, and another end of the buffering member is connected to the extendable tube.

The present invention further includes the following technical effects. Through the use of the buffering member in conjunction with the actuator, during the assembly of a nursing bed or hospital bed, there is no need to assemble the buffering member and the actuator separately. Consequently, the assembly procedure is simplified, and structure of the nursing bed or hospital bed is of relatively simpler design while the cost thereof is also reduced.

BRIEF DESCRIPTION OF DRAWING

FIG. 14 is an illustration showing the present invention after the extendable tube and the shaft of the buffering member move in;

DETAILED DESCRIPTION OF THE INVENTION

Figure 1:
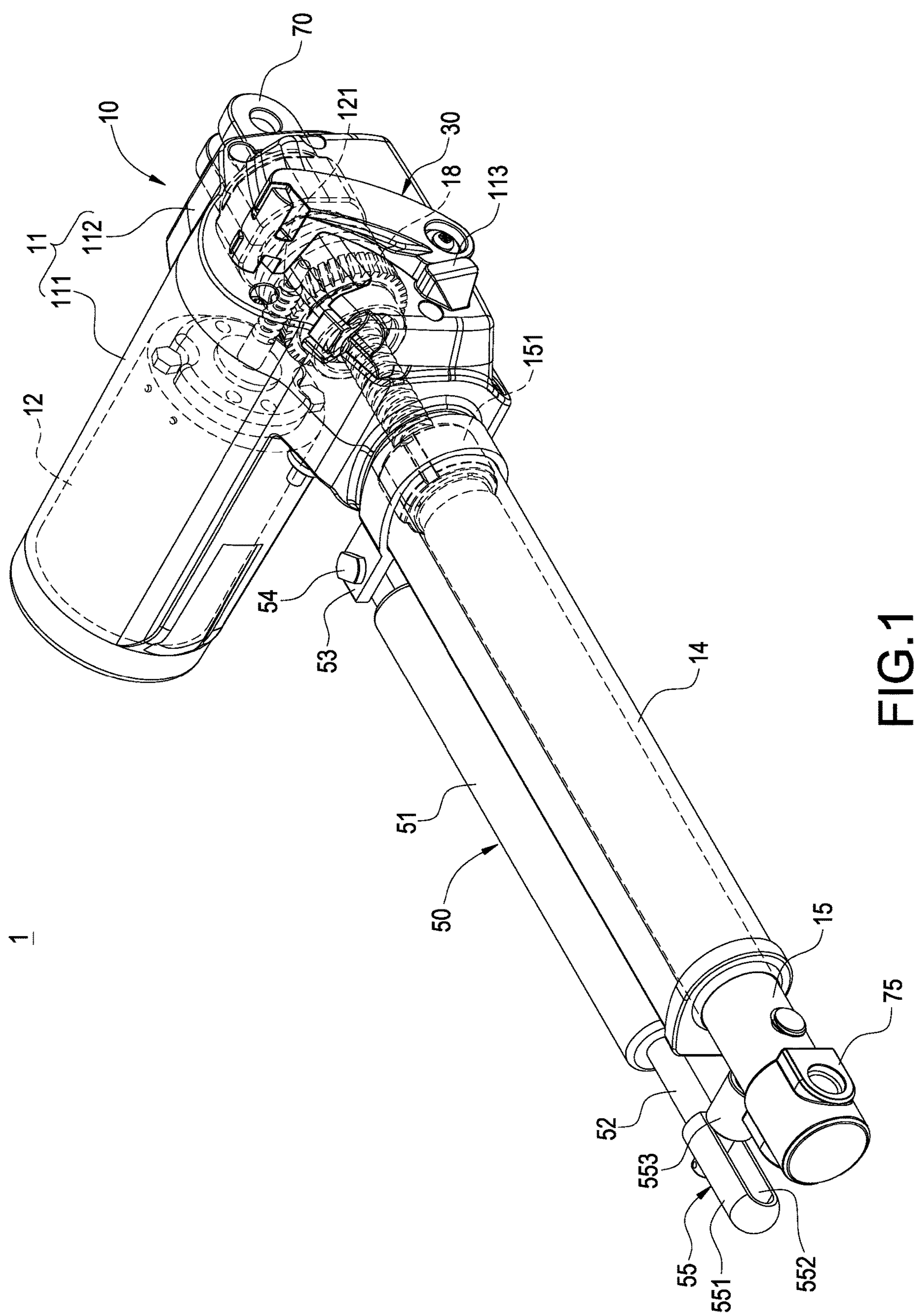
FIG. 1 is a perspective assembly view of a linear actuator of the present invention.
Figure 2:
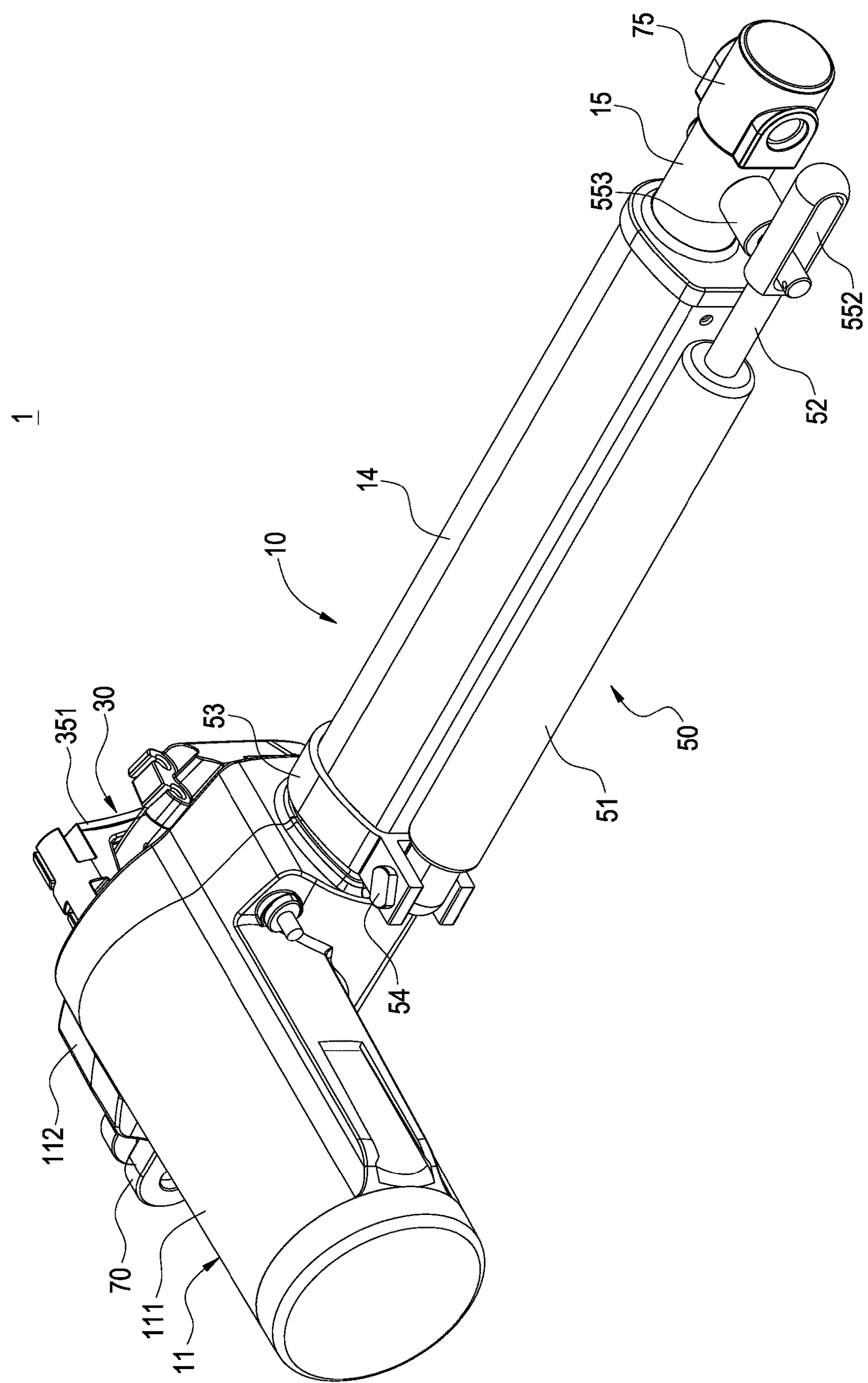
FIG. 2 is another perspective assembly view of a linear actuator of the present invention viewed from another angle.
Figure 3:
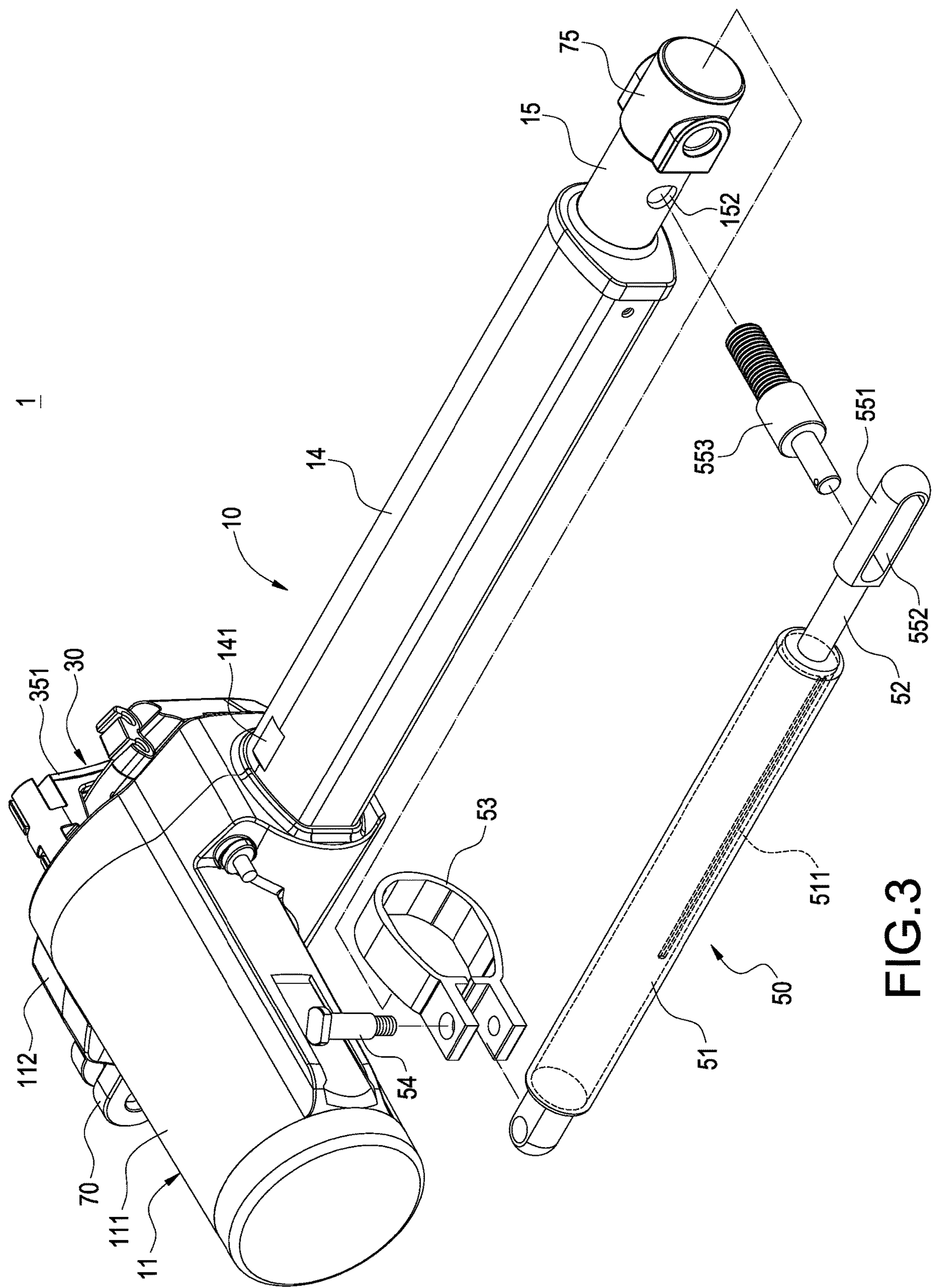
FIG. 3 is a perspective exploded view of the buffering member of the actuator main body.
Figure 4:
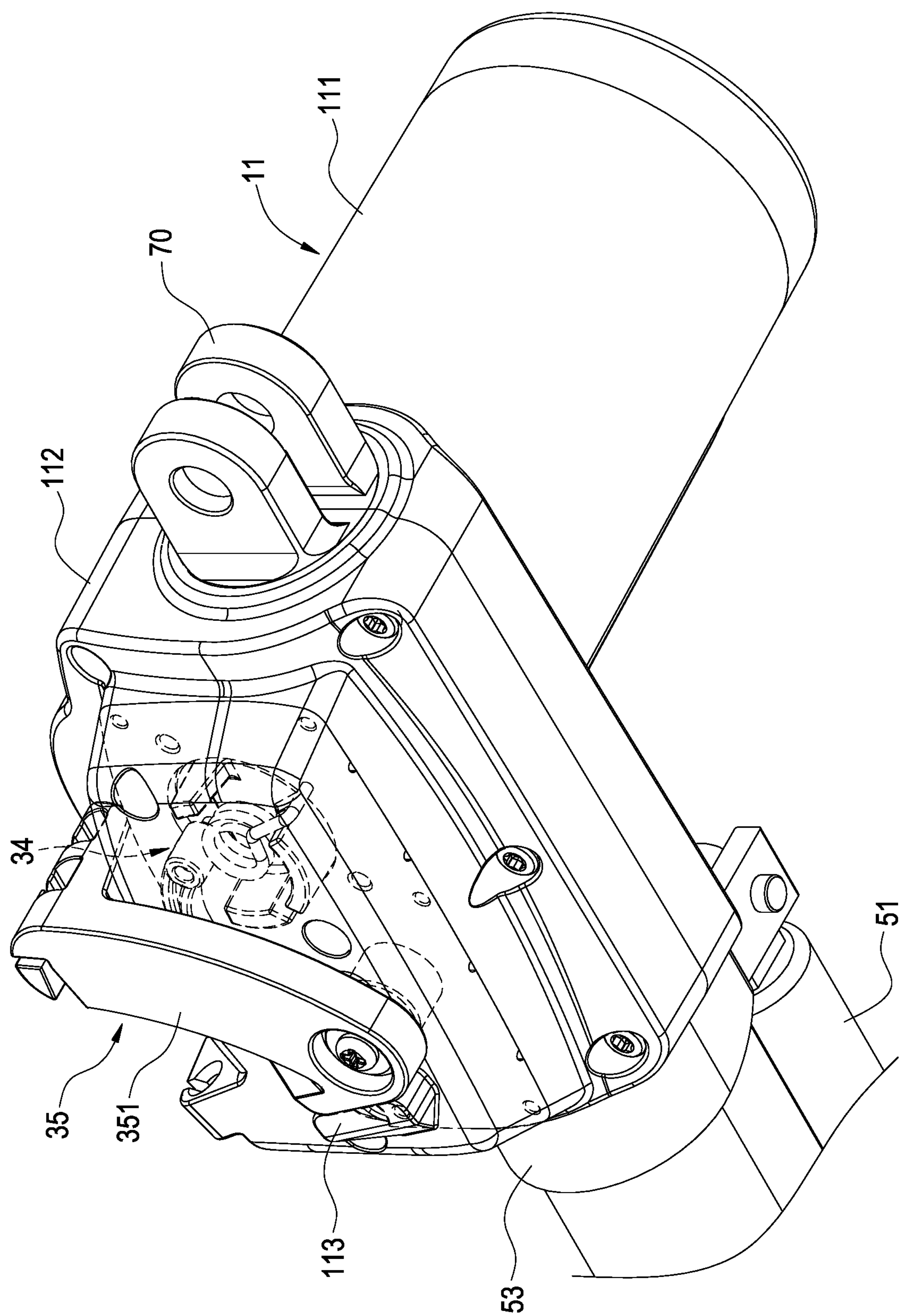
FIG. 4 is an enlarged view of a combination of partial areas of the linear actuator.

The following provides a detailed technical content of the present invention along with the accompanied drawings. However, the accompanied drawings are provided for reference and illustrative purpose only such that they shall not be used to limit the scope of the present invention.

As shown in FIG. 1 to FIG. 8, the present invention provides a linear actuator with a buffering mechanism, mainly comprising an actuator main body 10, a quick release mechanism 30 and a buffering mechanism 50.

The actuator main body 10 mainly comprises a housing base 11, a driving mechanism and a transmission mechanism.

The housing base 11 mainly comprises a lower housing 111 and an upper housing 112. The upper housing 112 and the lower housing 111 are both made of a plastic material. In addition, the lower housing 111 is formed by a circular tube section and a semi-housing shell extended from one end of the circular tube section. One end of the circular tube section away from the semi-housing shell is of a closed shape, and the upper housing 112 is also a semi-housing shell in order to be closed onto the semi-housing shell of the lower housing 111 correspondingly. Furthermore, the lower housing 111 and the upper housing 112 can be attached onto each other via fasteners, such as screws.

In an exemplary embodiment, the driving mechanism is an electric motor 12, and it is installed at an internal of the circular tube section of the lower housing 11, and it includes a worm shaft 121. The electric motor 12 can utilize the operation of the magnetic pole, coil and current etc. to allow the worm shaft 121 to generate clockwise and counterclockwise rotations.

Figure 5:
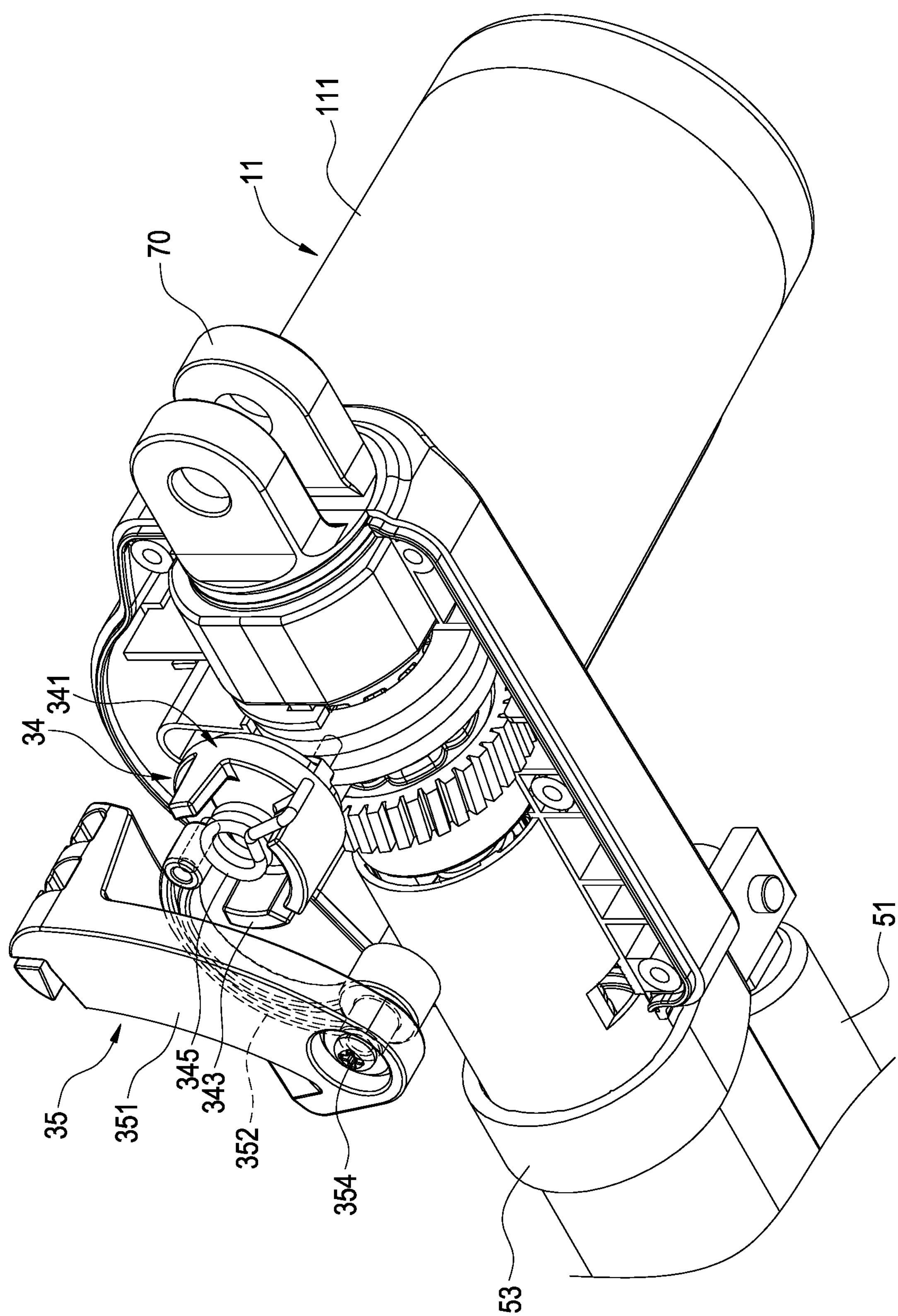
FIG. 5 is a configuration view of a combination of the quick release mechanism and the actuator main body of the present invention.
Figure 6:
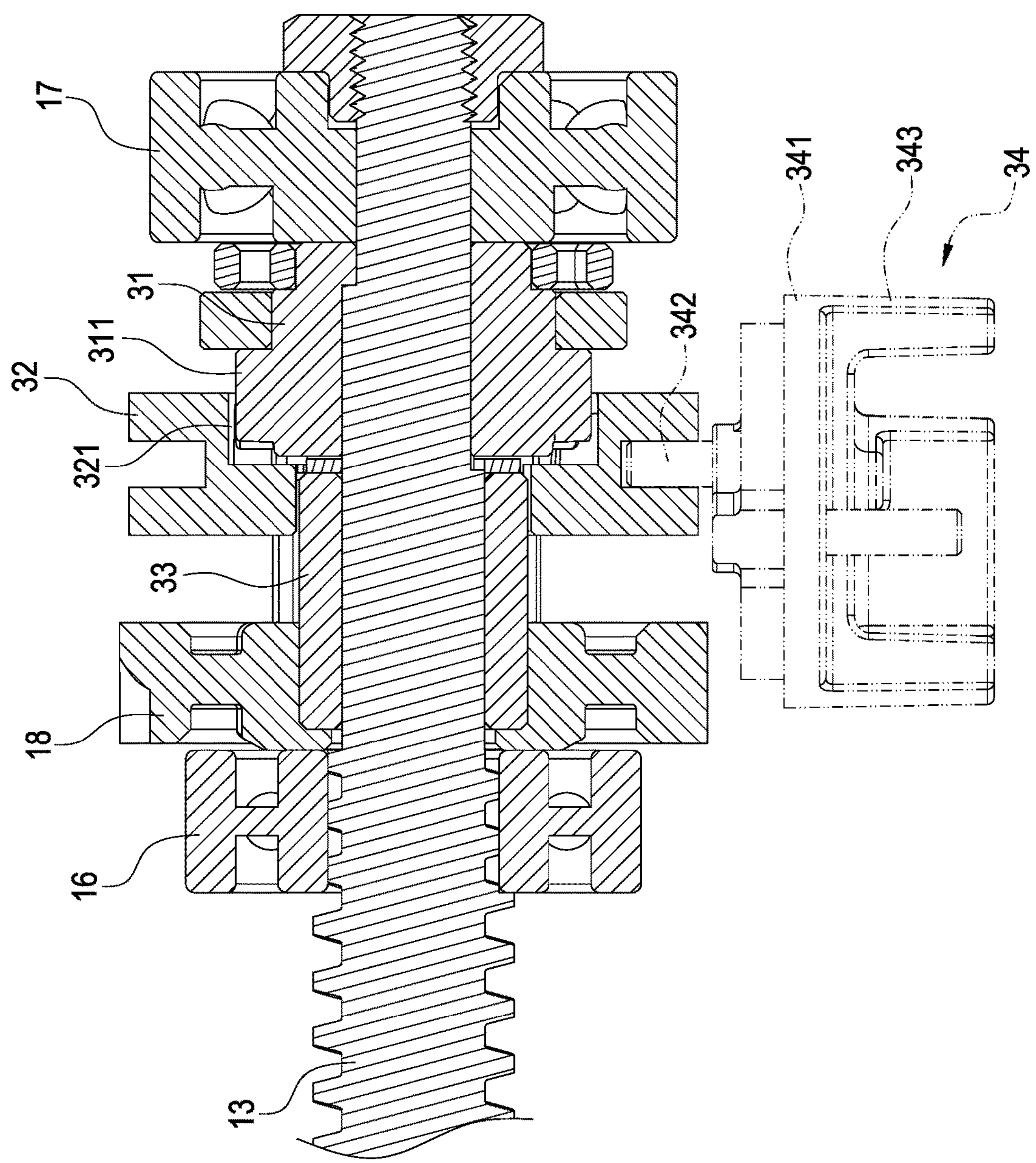
FIG. 6 is a cross sectional view of a combination of partial elements shown in FIG. 5.

In an exemplary embodiment of the present invention, the transmission mechanism mainly comprises a lead screw 13, an outer tube 14 and an extendable tube 15. The lead screw 13 is mounted via a front bearing 16 and a rear bearing 17 in order to allow the rear section of the lead screw 13 to be supported at the internal of the lower housing 111 (as shown in FIG. 5 and FIG. 6). The rest of the lead screw 13 protrudes out to the external of the housing base 11. In addition, the lead screw 13 at the rear side of the front bearing 16 includes a worm gear 18 mounted thereon corresponding to the aforementioned worm shaft 121 and engaged therewith. In an exemplary embodiment, the lead screw 13 is a non-self-locking worm shaft; in other words, when the extendable tube 15 is restricted such that it cannot generate rotation, the extendable tube 15 subject to the effect of axial pushing force or pressing force is able to allow the lead screw 13 to perform free rotation relative to the extendable tube 15, thereby allowing the extendable tube 15 to generate linear movement.

The outer tube 14 is a hollow member, and it is mounted along the outer perimeter of the lead screw 13. In addition, one end of the outer tube 14 is covered and secured by the lower housing 111 and the upper housing 112.

The end portion of the extendable tube 15 includes a nut 151 connected thereto. In addition, the extendable tube 15 is mounted onto the outer perimeter of the lead screw 13 and uses the nut 151 to engage with the aforementioned lead screw 13 for rotation. In addition, the outer perimeter of the nut 151 includes slots and blocking pieces (not shown in the drawings) engaged with the outer tube 14 in order to allow the nut 151 and the extendable tube 15 to perform linear movement at the internal of the out tube 14 only without performing any rotational movements.

The quick release mechanism 30 mainly comprises a positioning wheel 31 and a clutch wheel 32. The positioning wheel 31 and the clutch 32 are generally cylindrical members, and one side of the clutch wheel 32 includes a plurality of key receiving slots 321 formed thereon, and the outer perimeter of the positioning wheel 31 includes a plurality of protruding keys 311 formed thereon. Similarly, each protruding key and each key receiving slot can interchange the arrangements of the positioning wheel and the clutch wheel with each other. Each protruding key 311 can be inserted into each key receiving slot 321 in order to allow the clutch wheel 32 to be operably disengaged from or engaged with the positioning wheel 31 correspondingly.

Furthermore, the positioning wheel 31 is mounted onto the lead screw 13 and is secured thereon in order to allow the positioning wheel 31 to rotate along with the lead screw 13. The clutch wheel 32 is mounted onto the lead screw 13 via a guiding unit 33 and is formed on one side of the positioning wheel 31. The clutch wheel 32 is able to operably perform axial movement on the guiding unit 33.

The lead screw 13 is driven by the worm shaft 121 and worm gear 18 of the electric motor 12. In addition, when the clutch wheel 32 engages with the positioning wheel 31, the positioning wheel 31 and the clutch wheel 32 are able to rotate together due to the transmission of the lead screw 13. When the clutch wheel 32 disengages from the positioning wheel 31, the lead screw 13 is able to perform free rotation due to the pushing force of the extendable tube 15.

Figure 7:
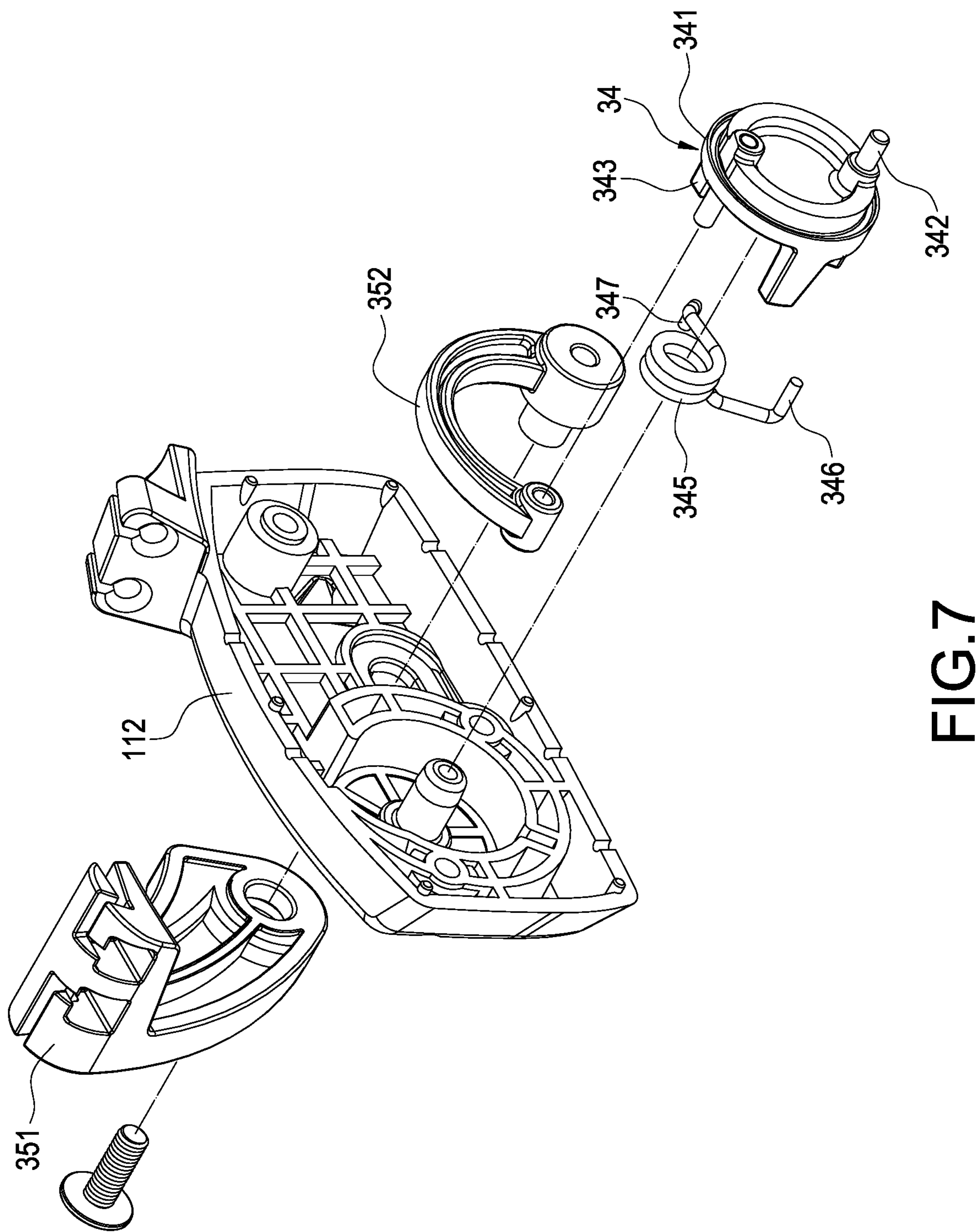
FIG. 7 is a perspective exploded view of the upper housing, the brake assembly and the connecting rod of the present invention.
Figure 8:
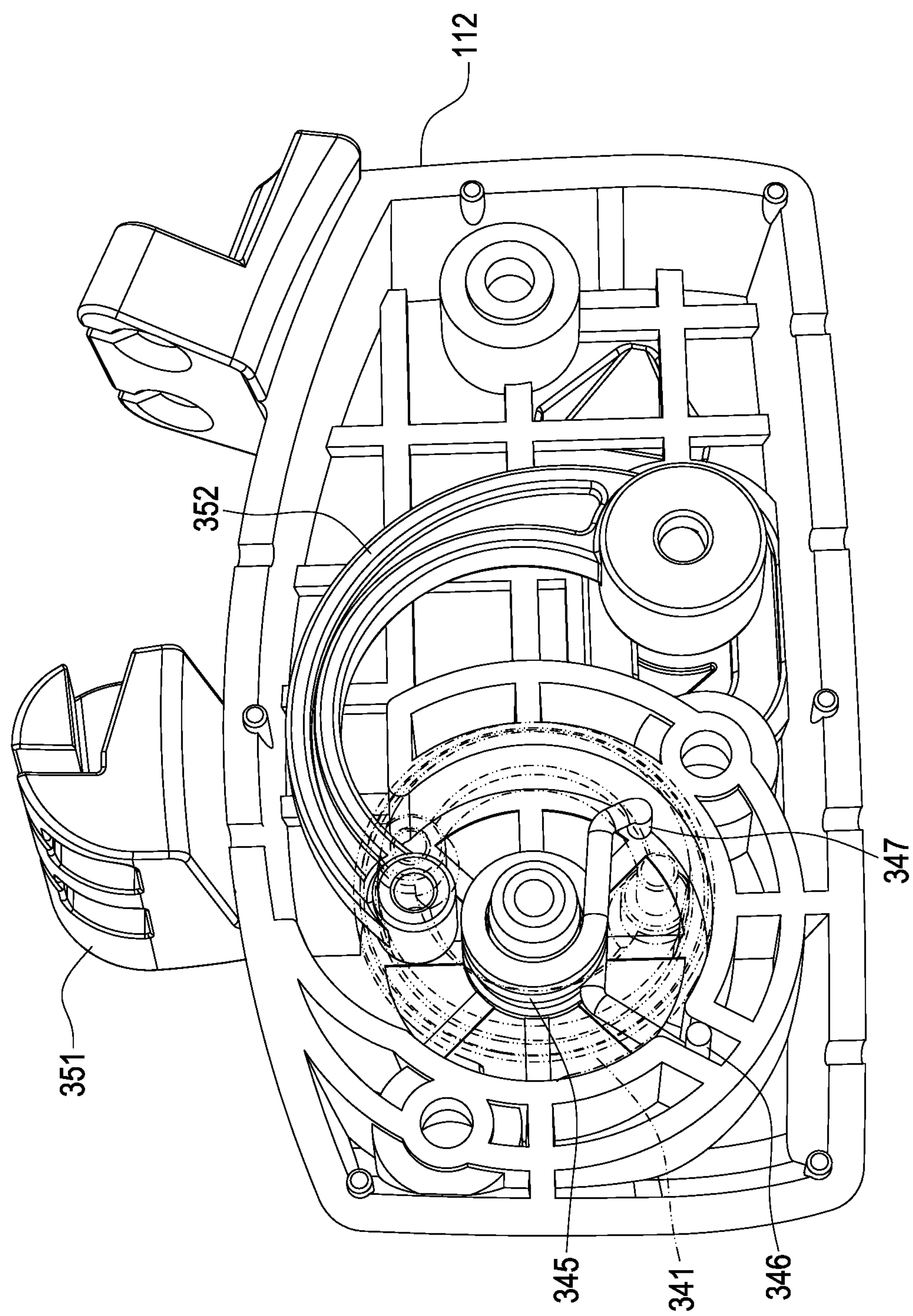
FIG. 8 is an assembly view of the upper housing, brake assembly and the connecting rod of the present invention.

Moreover, in an exemplary embodiment, the quick release mechanism 30 further comprises a retaining and pushing assembly 34, mainly comprising a disk 341 and a torsion spring 345. The bottom surface of the disk 341 includes a protruding column connected thereto, and a plurality of spacers 343 are formed at a top surface of the disk 341. The torsion spring 345 is arranged at a center location of the disk 341, and the torsion spring 345 includes a first torsion arm 346 and a second torsion arm 347. The end portion of the first torsion arm 346 is secured onto the aforementioned upper housing 112 (as shown in FIG. 8), and the second torsion arm 347 is arranged between any two of the spacers 343 (as shown in FIG. 7).

Figure 9:
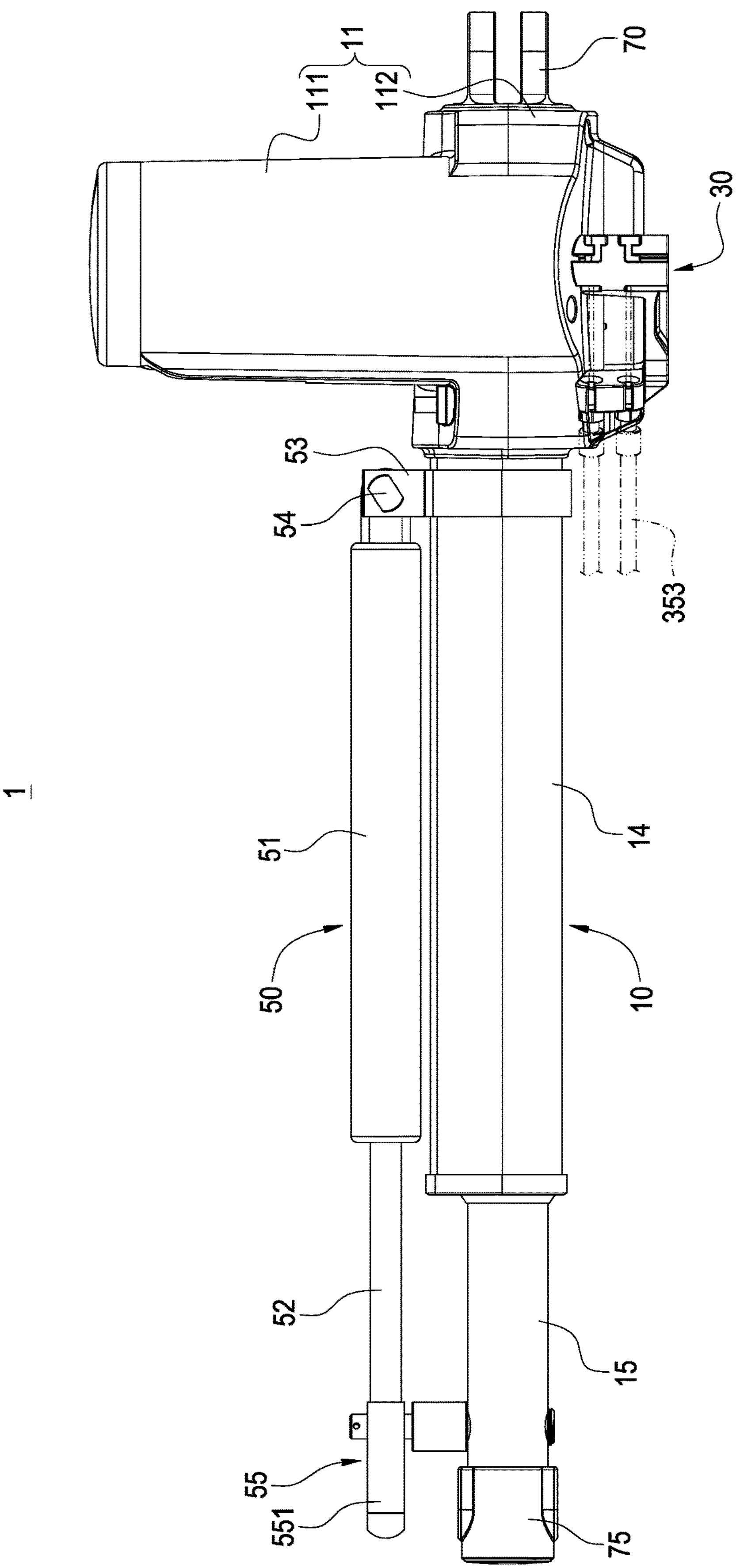
FIG. 9 is an illustration showing a state of use of the present invention after the extendable tube and the shaft of the buffering member move out.
Figure 10:
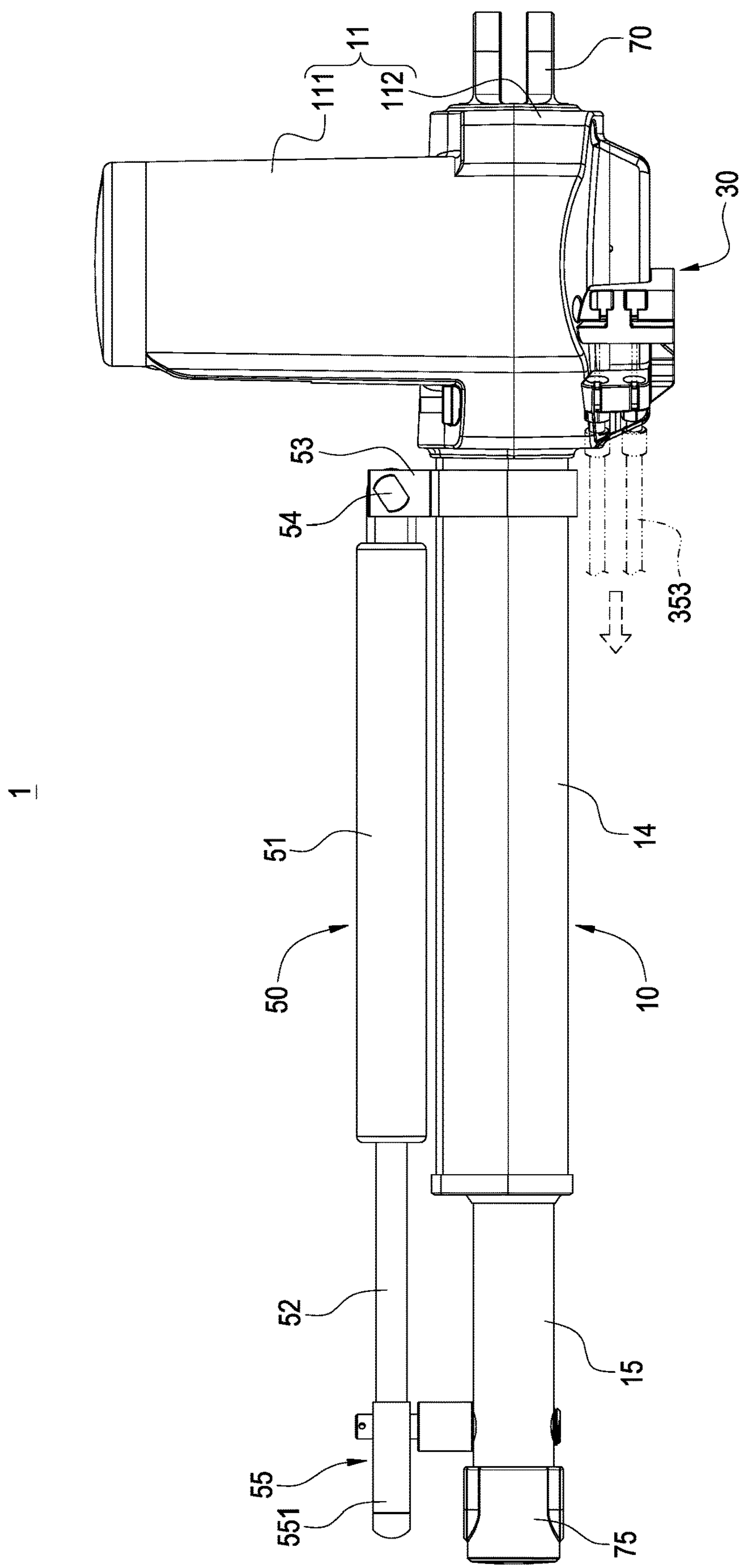
FIG. 10 is an illustration showing a state of use after the puling string of the present invention is actuated.
Figure 11:
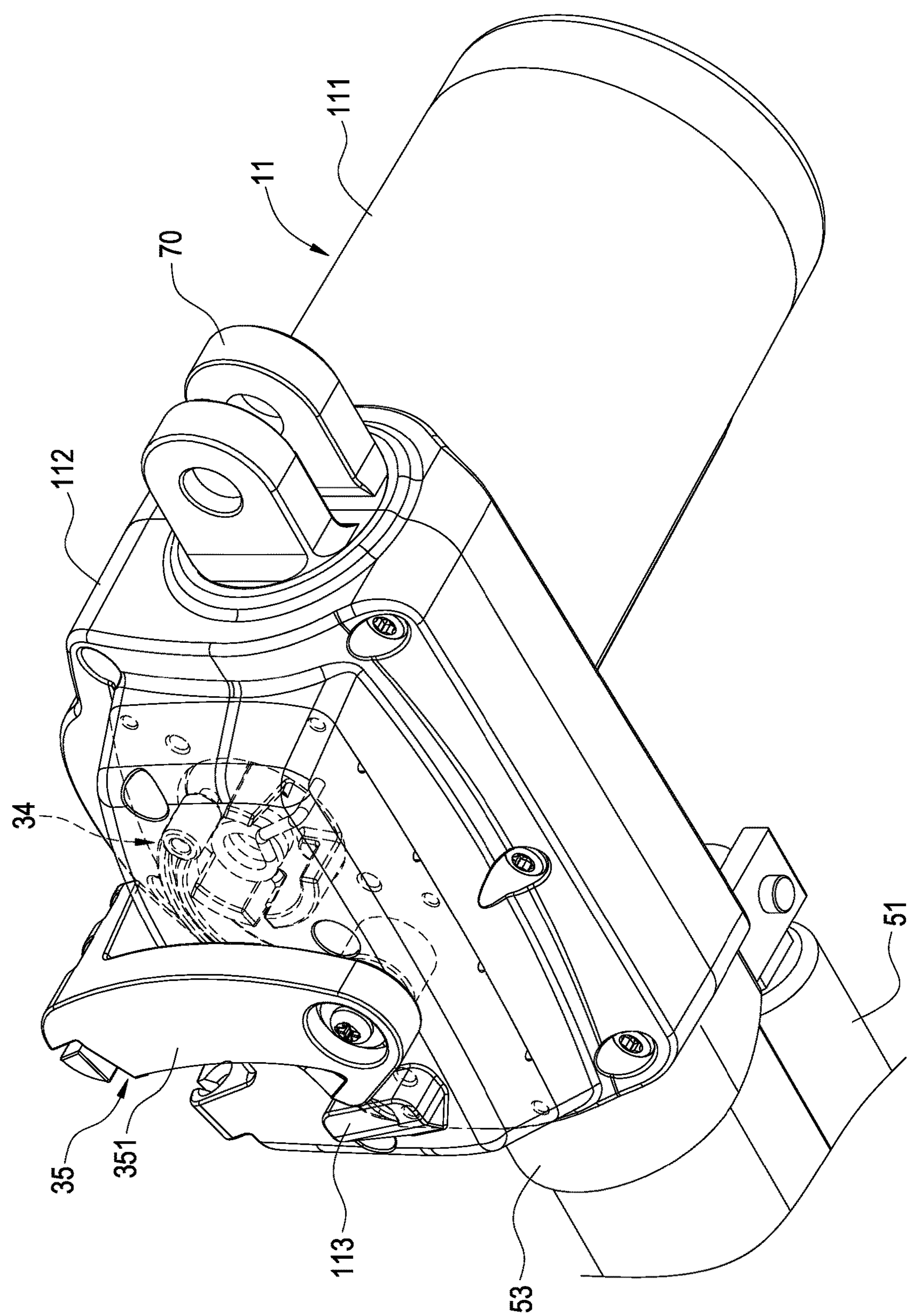
FIG. 11 is an illustration showing a state of use of the present invention after the dialing assembly and the brake assembly are actuated.

Furthermore, in an exemplary embodiment, the quick release mechanism 30 further comprises a dialing assembly 35. The dialing assembly 35 mainly comprises a dialer 351, a connecting rod 352 and a pulling string 353 (as shown in FIG. 9). One end of the dialer 351 is pivotally attached onto an outer portion of the upper housing 112 and is connected to one end of the connecting rod 352 via a bolt 354. Another end of the connecting rod 352 is connected to the disk 341. The pulling string 353 is connected to another end of the dialer 351. In addition, one side of the upper housing 112 corresponding to the dialer 351 includes an abutment piece 113 in order to allow the dialer 351 to perform abutting movement.

In an exemplary embodiment, the buffering member 50 is a variable damping pneumatic cylinder, and it includes a cylindrical unit 51 and a shaft 52 penetrating into the cylindrical unit 51. The buffering member 50 is arranged at one side of the external of the outer tube 14, and one end of the cylindrical unit 51 away from the shaft 52 is secured onto the outer tube via a mounting ring 53. One end of the shaft 52 away from the cylindrical unit 51 is connected to the extendable tube 15 via a connecting assembly 55. The aforementioned variable damping pneumatic cylinder, during the process of the shaft 52 retracting inward into the cylindrical unit 51, mainly comprises an initial stroke, a middle stroke and a final stroke; wherein a damping of the middle stroke is greater than a damping of the final stroke or the initial stroke, which can be designed and manufactured according to the actual needs. In addition, the variable damping pneumatic cylinder includes at least one exhaust slot 511 (please see FIG. 3) formed at an inner wall of the cylindrical unit 51. When a piston (not shown in the drawings) of the shaft 52 moves inside the cylindrical unit 51, such exhaust slot 511 is able to reduce a moving damping of the shaft 52. On the contrary, for positions where no such exhaust slot 511 is formed, the damping becomes greater.

Furthermore, one end of the outer tube 14 adjacent to the housing base 11 includes a positioning slot 141 formed thereon. The mounting ring 53 is inserted inside the positioning slot 141 and uses a bot 54 penetrating into the end portion of the cylindrical unit and fastening the mounting ring 53 in order to be secured. Similarly, the cylindrical unit 51 can also be secured onto the outer tube 14 via a welding method.

Moreover, one end of the extendable tube 15 exposed out of the outer tube 14 includes a through hole 151 formed thereon. The connecting assembly 55 comprises an elongated portion 551 and a fixation rod 553. The elongated portion 551 is connected to the end portion of the aforementioned shaft 52 and a groove 552 is formed on the elongated portion 551. One end of the fixation rod 553 penetrates into and secured inside the through hole 151 of the extendable tube 15, and another end of the fixation rod 553 is received inside the aforementioned groove 552. In addition, a length of the groove 552 is greater than an outer diameter of another end of the fixation rod 553 in order to form a separation between the fixation rod 553 and the groove 552, thereby preventing the fixation rod 553 from causing direct impacts on the elongated portion 551.

Furthermore, a linear actuator 1 with a buffering mechanism of the present invention further comprises a rear supporting seat 70 and a front supporting seat 75. The rear supporting seat 70 is mounted onto the rear side of the rear bearing 17 and is clamped by the upper housing 112 and the lower housing 111 for securement. The front supporting seat 75 is mounted onto the end portion of the extendable tube 15 away from the nut 151.

As shown in FIG. 5 and FIG. 6, under a normal state, the protruding column 342 is inserted into the groove of the clutch wheel 32. The first torsion arm 346 of the torsion spring 345 is secured onto the aforementioned upper housing 112 (as shown in FIG. 8). The second torsion arm 347 performs elastic pushing corresponding to the spacer 343 such that when the disk 341 is subject to the elastic force of the torsion spring 345, the protruding column 342 is able to generate a blocking effect on the clutch wheel 32 and to allow the clutch wheel 32 and the positioning wheel 31 to maintain under the engagement state with each other.

Figure 19:
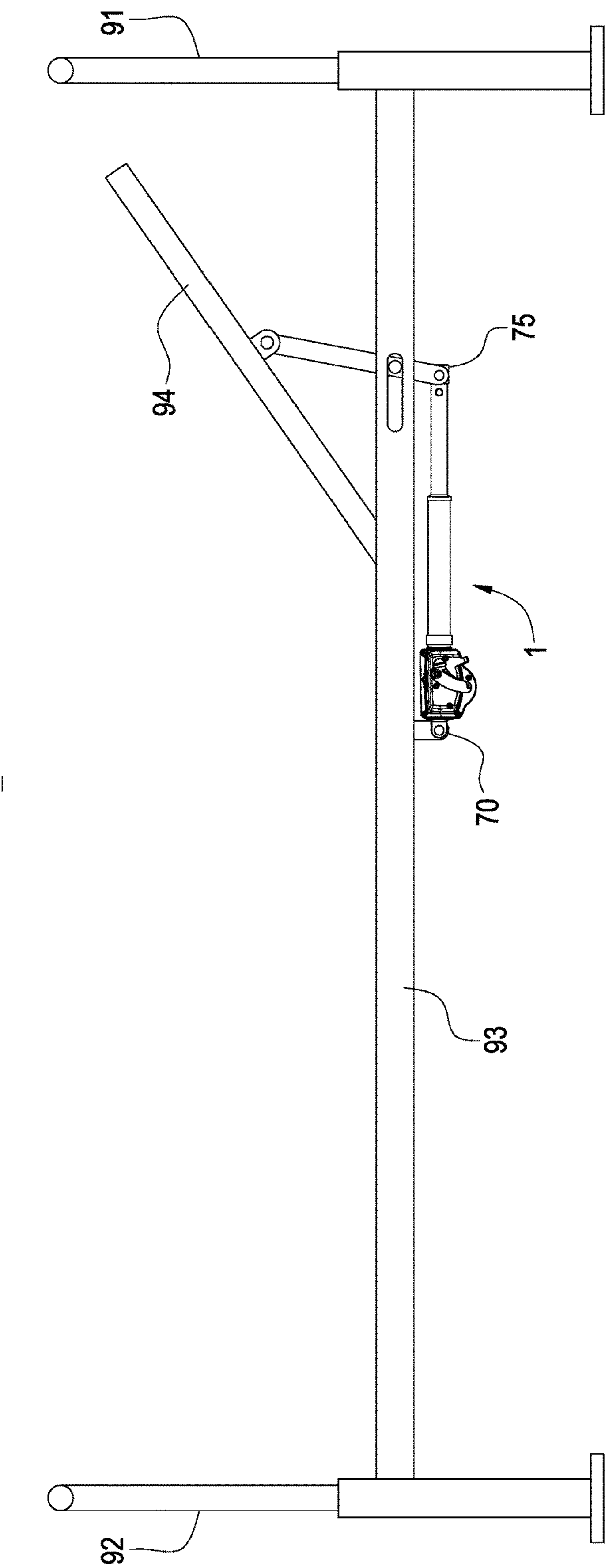
FIG. 19 is an assembly view of a linear actuator of the present invention applied to a nursing bed.

As shown in FIG. 9 and FIG. 19, the aforementioned linear actuator 1 is installed on a nursing bed 9. The nursing bed 9 includes a first end 91, a second end 92 and a bed frame 93 arranged between the first end 91 and the second end 92. The bed frame 93 includes an adjustable portion 94. During the use, the rear supporting seat 70 is secured onto the bed frame 93, and the front supporting seat 75 is connected to the adjustable portion 94. The rotation of worm shaft 121 of the electric motor 12 drives the worm gear 18 to rotate, and the worm gear 18 is able to drive the lead screw 13 to rotate. Since the extendable tube 15 is restricted by the outer tube 14, during the rotational process of the lead screw 13, the extendable tube 15 is able to generate linear movement in the axial direction relative to the lead screw 13 in order to allow the front section of the electric hospital bed or nursing bed to generate a lifting action. Moreover, the fixation rod 553 is able to drive the shaft 52 to perform linear movement toward a direction away from the cylindrical unit 51.

Figure 12:
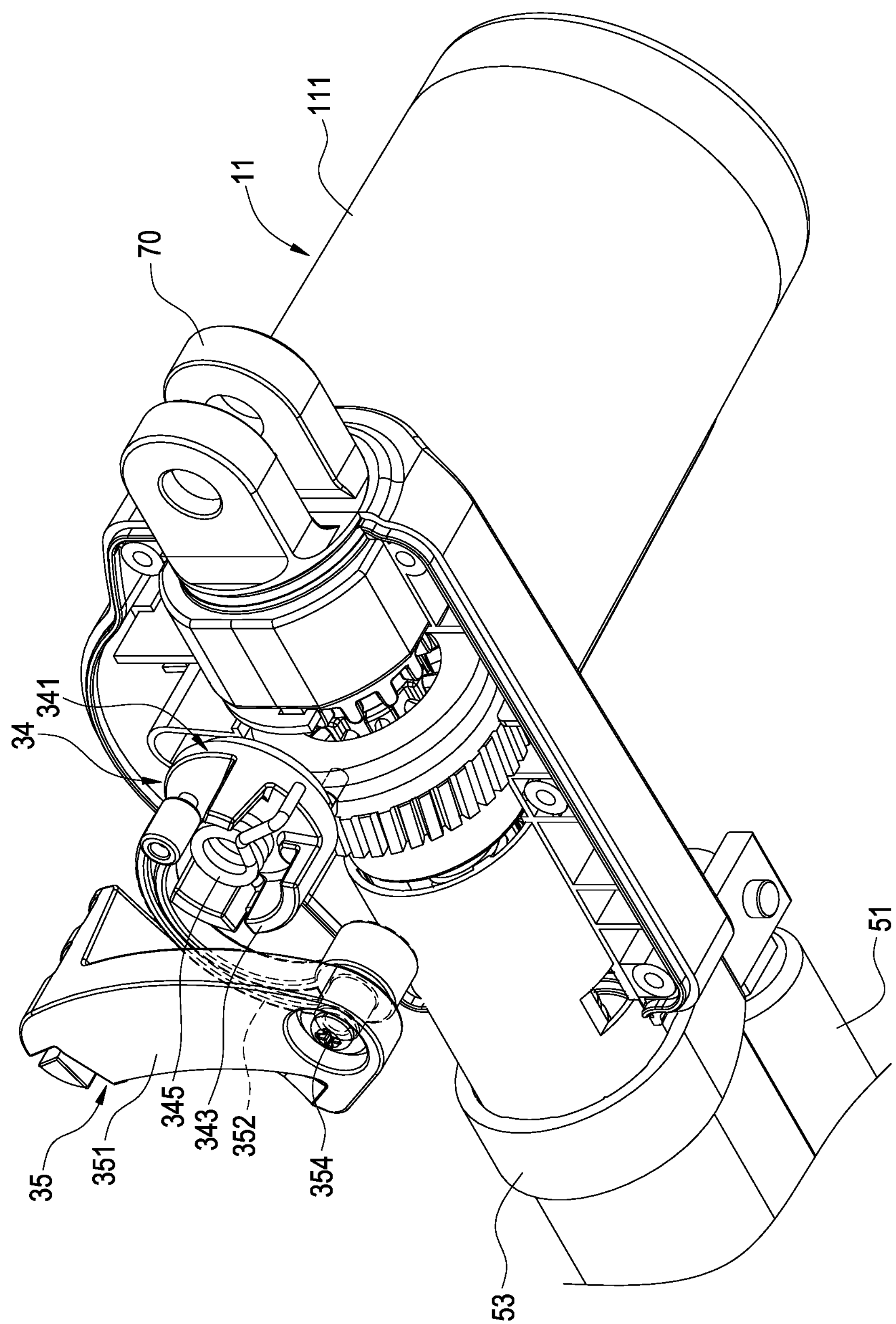
FIG. 12 is an illustration showing a state of use of the brake assembly and the clutch wheel as shown in FIG. 11.
Figure 13:
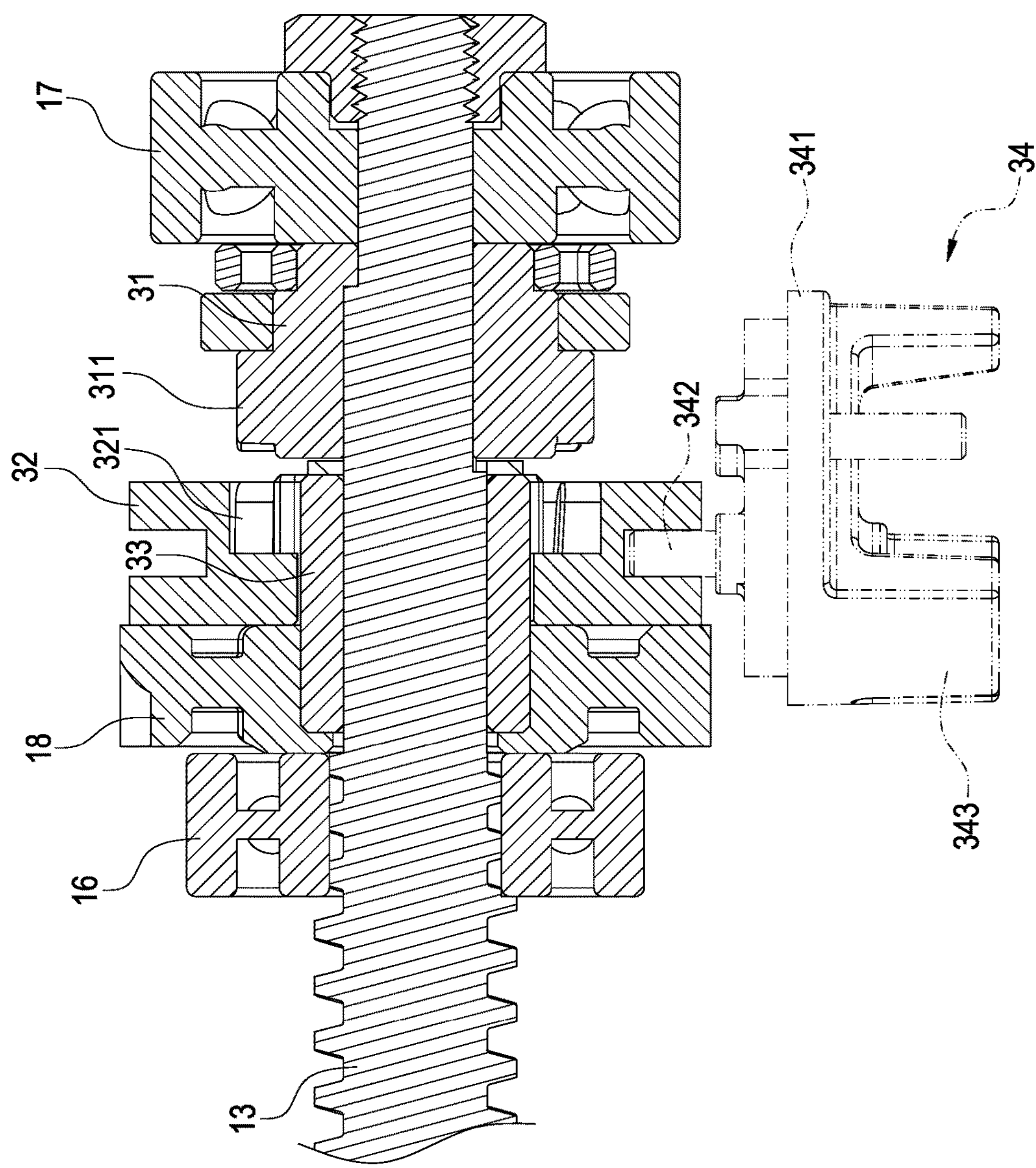
FIG. 13 is a cross sectional view of a combination of partial elements of FIG. 12.
Figure 14:
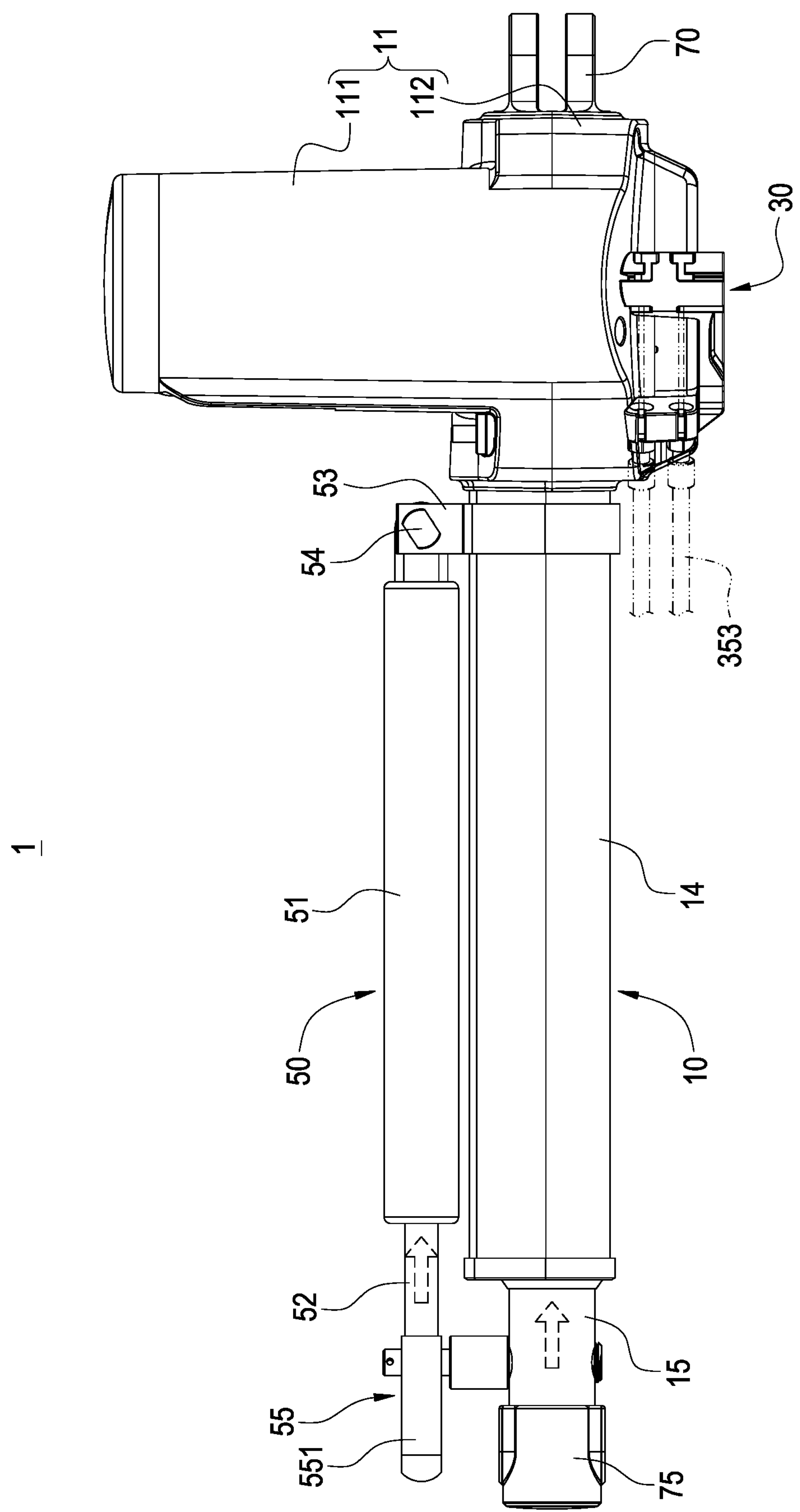

Please refer to FIG. 10 to FIG. 14. During the rescue process of a patient and when there is a need to perform electric shock with the patient lying down flatly, the pulling string 353 can be pulled to allow the dialer 351 to generate rotation, such that the rotation of the dialer 351 is able to drive the connecting rod 352 to rotate the disk 341. In addition, the rotation of the disk 341 is able to drive the protruding column 342 to move the clutch wheel 32 toward a direction away from the positioning wheel 31, thereby allowing the clutching 32 to be disengaged and released from the positioning wheel 31 (as shown in FIG. 12 and FIG. 13). Due to the force generated by the body weight of the patient or the pressing force exerted by a nursing person on the front section of the electric hospital bed or nursing bed, once the extendable tube 15 is under the aforementioned force of exertion, the nut 151 can be utilized to drive the lead screw 13 to generate fast rotation, and it is retracted into the internal of the outer tube 14. Through the configuration of such buffering member 50, when the extendable tube 15 retracts into the outer tube 14, it is able to absorb the impact force of the extendable tube 15 during rapid descending thereof. Consequently, it is able to reduce possible injuries caused on the patient while increasing the use comfort for users.

The buffering force of the buffering member 50 is adjustable. In other words, by adjusting the internal gas volume inside the pneumatic cylinder used by the buffering member 50, buffering force can be absent at the initial stage of the quick release in order to allow the adjustable portion 94 to perform quick release at full speed. When the adjustable portion 94 of the bed frame 94 is close to the horizontal position, the buffering member 50 can be used to provide buffering force in order to reduce the impact force generated during the rapid descending of the extendable tube 15. Consequently, it is able to achieve the objective of quick release without increasing the period of time for quick release due to the buffering force provided by the buffering member 50.

Figure 15:
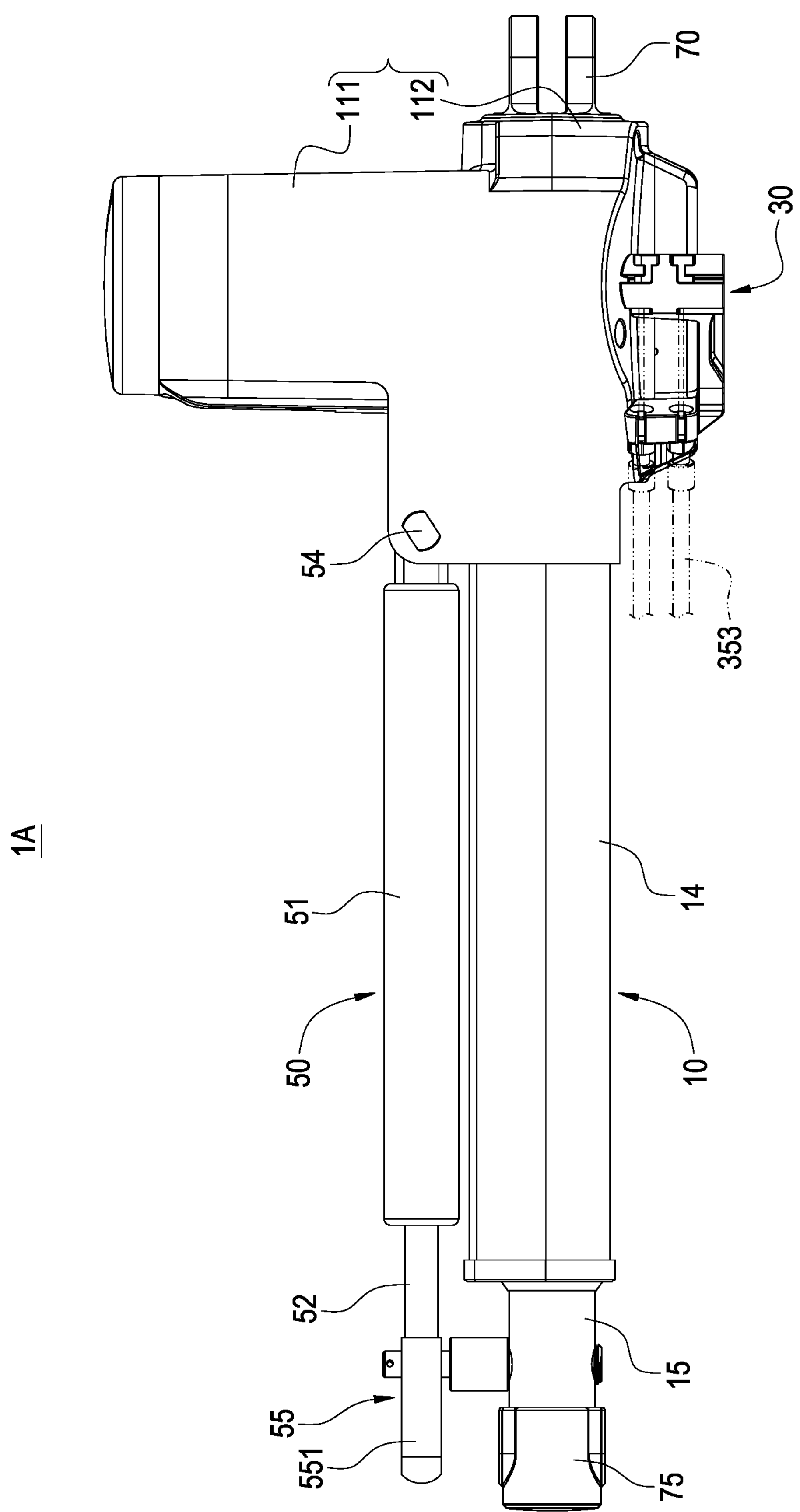
FIG. 15 is an assembly outer appearance view of a linear actuator according to another embodiment of the present invention.

Please refer to FIG. 15, showing another exemplary embodiment of a linear actuator with a buffering mechanism of the present invention. In this exemplary embodiment, different from the previously mentioned exemplary embodiment, a linear actuator 1A with a buffering mechanism comprising an actuator body 10, a quick release mechanism 30 and a buffering member 50 that are generally identical to the ones described in the aforementioned exemplary embodiment. Nevertheless, one end of the cylindrical unit 51 of the buffering member 50 is pivotally attached onto the lower housing 111 of the housing base 11 via a bolt 54 in order to achieve a technical effect equivalent to that of the aforementioned embodiment.

Similarly, one end of the cylindrical unit 51 can also be secured onto the lower housing 111 of the housing base 11 via a welding method, instead of the securement method with the use of the bolt 54.

Figure 16:
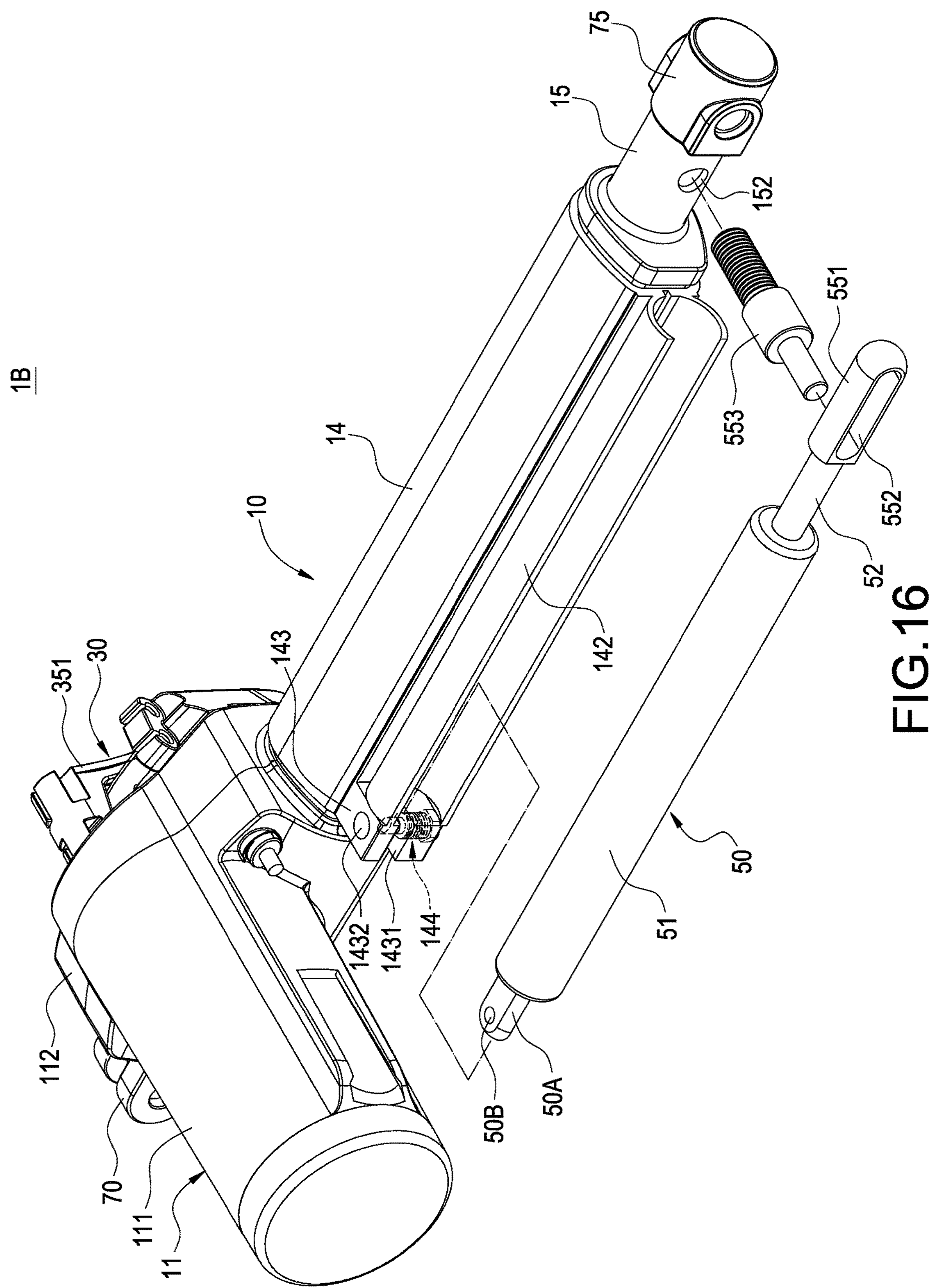
FIG. 16 is a perspective exploded view of a linear actuator according to still another embodiment of the present invention.
Figure 17:
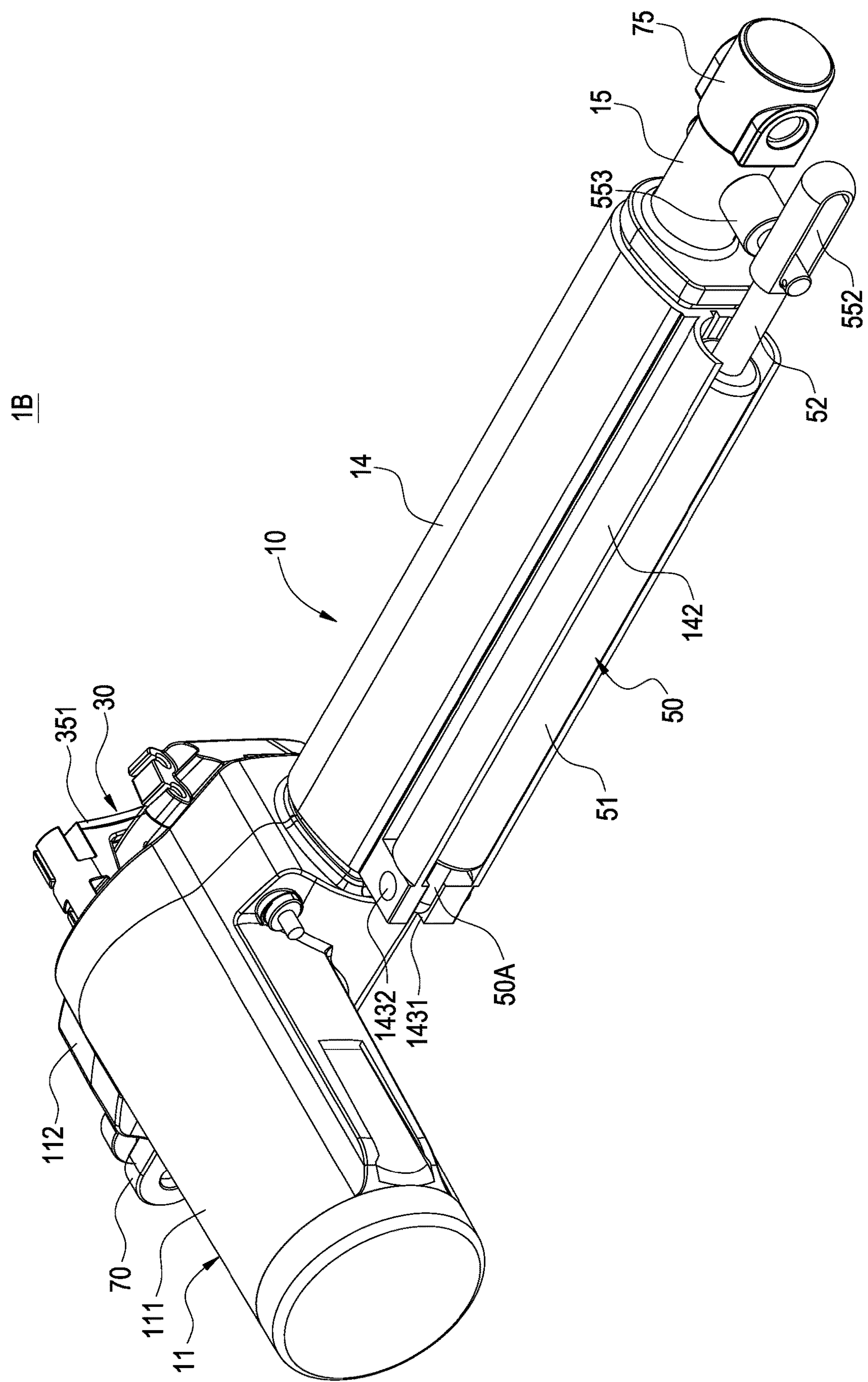
FIG. 17 is an assembly outer appearance view of a linear actuator according to still another embodiment of the present invention.
Figure 18:
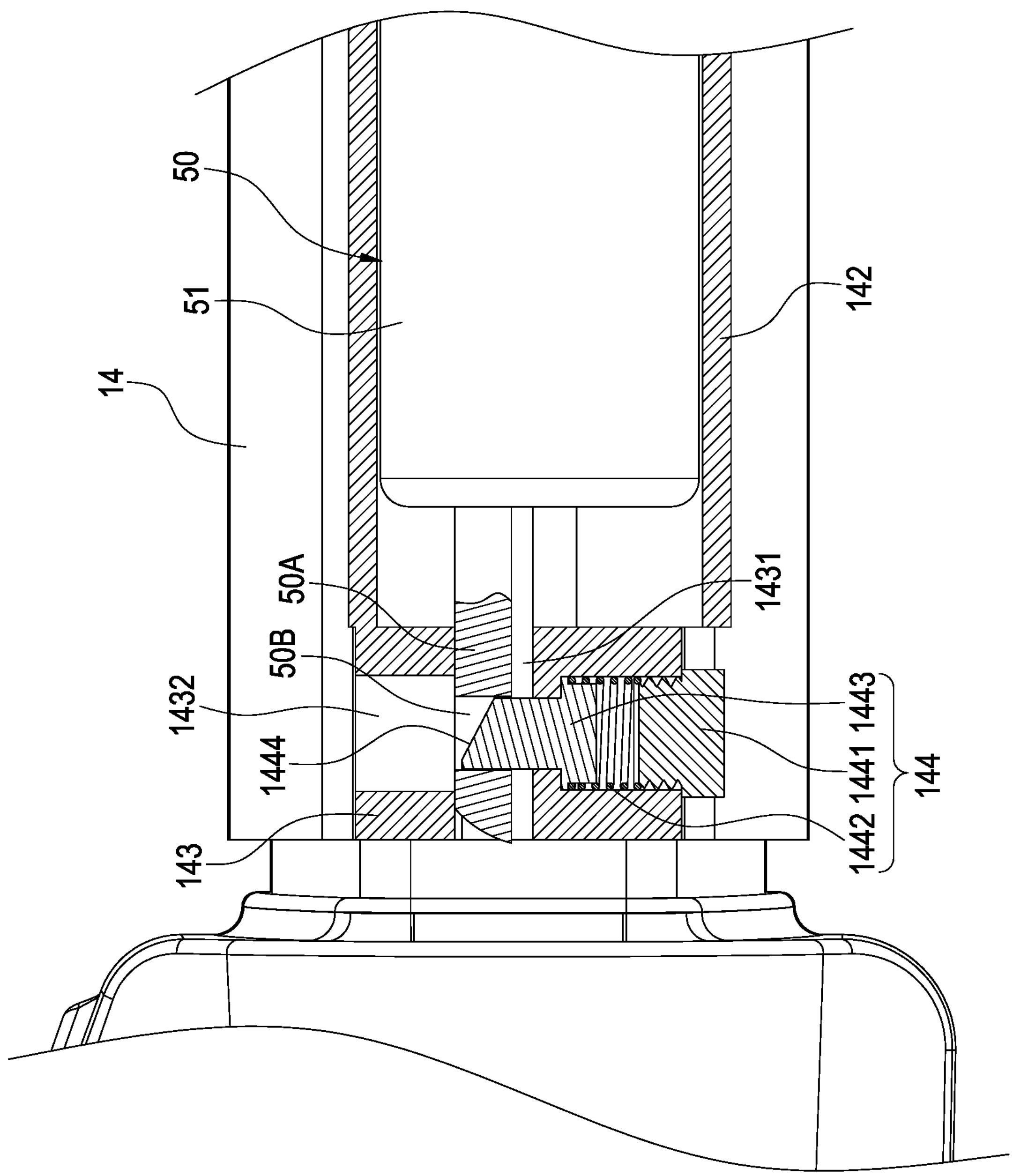
FIG. 18 is a partial cross-sectional view of a linear actuator according to still another embodiment of the present invention.

Please refer to FIG. 16 to FIG. 18. In another exemplary embodiment, a linear actuator 1B differs from the aforementioned exemplary embodiments in that: the outer tube 14 includes a guiding tube 142 and a connecting base 143 extended from one side thereof, and the buffering member 50 includes an end portion 50A. In addition, the end portion 50A includes a locking hole 50B formed thereon. In this exemplary embodiment, the cross section of the guiding tube 142 is of a "C" shape, and it is provided to allow the aforementioned buffering member 50 to be received therein. The connecting base 143 includes an elastic locking assembly 144 installed thereon. The connecting base 143 includes a cut-out slot 1431 and connecting hole 1432 fluidly connected to the cut-out slot 1431. The elastic locking assembly 144 mainly comprises a fastener 1441, an elastic member 1442 and a penetrating latch 1443. The penetrating latch 1443 is received inside the connecting hole 1432 and is exposed at the cut-out slot 1431, and also includes a guiding slanted surface 1444 formed at an end portion of the cut-out slot 1431. The elastic member 142 is clamped between the fastener 1441 and the penetrating latch 1443.

During the installation, when the buffering member 50 is installed into the internal of the guiding tube 141, the end portion 50A of the buffering member 50 is able to push the guiding slanted surface 1444 correspondingly in order to allow the penetrating latch 1443 to be buried inside the connecting hole 1432. In addition, when the locking hole 50B of the end portion 50A aligns with the position of the penetrating latch 1443, it is able to use the elastic force generated by the elastic member 1442 on the penetrating latch 1443 in order to allow the penetrating latch 1443 to penetrate into the locking hole 50B, thereby achieving fast installation thereof.

In view of the above, a linear actuator with a buffering mechanism of the present invention is able to achieve the objectives of the present invention and to overcome the drawbacks of known arts. The present invention is novel and of inventive step, which satisfies the patentability requirements. The above describes the preferable and feasible exemplary embodiments of the present invention for illustrative purposes only, which shall not be treated as limitations of the scope of the present invention. Any equivalent changes and modifications made in accordance with the scope of the claims of the present invention shall be considered to be within the scope of the claim of the present invention.

What is claimed is:

1. A linear actuator with a buffering mechanism, installed on a nursing bed, the nursing bed (9) having a first end (91), a second end (92) and a bed frame arranged between the first end (91) and the second end (92), the bed frame (93) having an adjustable portion (94), the linear actuator (1) comprising:

an actuator main body (10) comprising a housing base (11), a driving mechanism and a transmission mechanism; the driving mechanism arranged inside the housing base (11), the transmission mechanism comprising an outer tube (14) connected to the housing base (11) and an extendable tube (15) inserted into the outer tube (14); the driving mechanism driving the transmission mechanism to allow the extendable tube (15) to perform extension and retraction movements relative to the outer tube (14);

a quick release mechanism (30) installed on the actuator main body (10); the quick release mechanism (30) comprising a positioning wheel (31) and a clutch wheel (32); the clutch wheel (32) having a plurality of key receiving slots (321) arranged on one side thereof; the positioning wheel (31) having a plurality of protruding keys (311) arranged at an outer perimeter thereof; each one of the protruding keys (311) configured to be inserted into each one of the key receiving slots (321), thereby allowing the clutch wheel (32) to be operably disengaged from or engaged with the positioning wheel (31) correspondingly; and a buffering member (50) arranged at one side of the outer tube (14); one end of the buffering member (50) connected to outer tube (14), and the other end thereof connected extendable tube (15).

2. The linear actuator with a buffering mechanism according to claim 1, wherein the buffering member (50) is arranged on an outer portion of the outer tube (14), and the buffering member (50) includes a cylindrical unit (51) and a shaft (52) penetrating into the cylindrical unit (51); one end of the cylindrical unit (51) away from the shaft (52) is secured onto the outer tube (14), and one end of the shaft (52) away from the cylindrical unit (51) is connected to the extendable tube (15).

3. The linear actuator with a buffering mechanism according to claim 2, wherein the cylindrical unit (51) is secured onto the outer tube (14) via a mounting ring (53), and the shaft (52) is connected to the extendable tube (15) via a connecting assembly (55).

4. The linear actuator with a buffering mechanism according to claim 3, wherein one end of the outer tube (14) adjacent to the housing base (11) includes a positioning slot (141) formed thereon, and the mounting ring (53) is inserted into the positioning slot (141) and penetrates through an end portion of the cylindrical unit (51) via a bolt (54) and fastening the mounting ring (53) in order to achieve the securement thereof.

5. The linear actuator with a buffering mechanism according to claim 3, wherein the connecting assembly (55) includes an elongated portion (551) and a fixation rod (553); the elongated portion (551) is connected to an end portion of the shaft (52); the extendable tube (15) includes a through hole (152) formed thereon; one end of the fixation rod (553) penetrates into and is secured inside the through hole (152).

6. The linear actuator with a buffering mechanism according to claim 5, wherein the elongated portion (551) includes a groove (552), another end of the fixation rod (553) is received inside the groove (552), and a length of the groove (552) is greater than an outer diameter of the another end of the fixation rod (553).

7. The linear actuator with a buffering mechanism according to claim 2, wherein the cylindrical unit (51) is secured onto the outer tube (14) via a welding method; the shaft (52) is connected onto the extendable tube (15) via a connecting assembly (55).

8. The linear actuator with a buffering mechanism according to claim 1, wherein the transmission mechanism further comprises a lead screw (13), the extendable tube (15) includes a nut (151); one end of the lead screw (13) is mounted and supported inside the housing base (11) via front bearing (16) and a rear bearing (17); another end of the lead screw (13) extends into the outer tube (14) in order to engage with the nut (151) for transmission.

9. The linear actuator with a buffering mechanism according to claim 8, wherein the positioning wheel (31) is mounted onto the lead screw (13) and is secured thereon in order to allow the positioning wheel (31) to rotate along with the lead screw (13); the clutch wheel (32) is mounted onto the lead screw (13) via a guiding unit (33) and is formed on one side of the positioning wheel (31), and the clutch wheel (32) is configured to move on the guiding unit (33) in order to allow the clutch wheel (32) to disengage or engage with the positioning wheel (31) relatively.

10. The linear actuator with a buffering mechanism according to claim 9, wherein the quick release mechanism (30) further comprises a retaining and pushing assembly (34); the retaining and pushing assembly (34) comprises a disk (341) and a torsion spring (345); the disk (341) includes a protruding column (342) connected thereto and a plurality of spacers (343) formed thereon; the torsion spring (345) is arranged on the disk (341), and the torsion spring (345) is arranged on the disk (341); the torsion spring (345) includes a torsion arm (346) and a second torsion arm (347); and an end portion of the first torsion arm (346) is secured onto the housing base (11), and the second torsion arm (347) is arranged between any two of the spacers (343).

11. The linear actuator with a buffering mechanism according to claim 10, wherein the quick release mechanism (30) further comprises a dialing assembly (35); the dialing assembly (35) comprises a dialer (351), a connecting rod (352) and a pulling string (353); one end of the dialer (351) is pivotally attached onto an outer portion of the housing base (11) and is connected to another end of the connecting rod (352) via a bolt penetrating therethrough; another end of the connecting rod (352) is connected onto the disk (341); the pulling string (353) is connected to another end of the dialer (351).

12. The linear actuator with a buffering mechanism according to claim 1, wherein the buffering member (50) is a variable damping pneumatic cylinder.

13. The linear actuator with a buffering mechanism according to claim 1, wherein the outer tube (14) includes a guiding tube (142) and a connecting base (143) extended therefrom; the buffering member (50) is received inside the guiding tube (142), and one end of the buffering member (50) is connected to the connecting base (143) via an elastic locking assembly (144).

14. The linear actuator with a buffering mechanism according to claim 13, wherein the buffering member (50) includes an end portion (50A), and the end portion (50A) includes a locking hole (50B); the connecting base (143) include a cut-out slot (1431) and connecting hole (1432) fluidly connected to the cut-out slot (1431); the end portion (50A) is received in the cut-out slot (1431); the elastic locking assembly (144) comprises a penetrating latch (1443) received inside the connecting hole (1432) and exposed at the cut-out slot (1431); the penetrating latch (1443) penetrates into the locking hole (50B) correspondingly.

15. The linear actuator with a buffering mechanism according to claim 14, wherein the elastic locking assembly (144) further comprises a fastener (1441) and an elastic member (1442); the elastic member (1442) is received inside the connecting hole (1432) and is elastically clamped between the fastener (1441) and the penetrating latch (1443).

16. The linear actuator with a buffering mechanism according to claim 14, wherein the penetrating latch (1443) includes a guiding slanted surface (1444) formed at an end portion of the cut-out slot (1431).

17. A linear actuator (1A) with a buffering mechanism comprising:

an actuator main body (10), comprising a housing base (11), an outer tube (14) connected to the housing base (11) and an extendable tube (15) penetrating into the outer tube (14) and capable of moving relative to the outer tube (14);

a quick release mechanism (30) installed on the actuator main body (10); and a buffering member (50) arranged on one side of the outer tube (14); one end of the buffering mechanism (50) connected to the housing baes (11), and another end of the buffering member (50) connected to the extendable tube (15).

18. The linear actuator (1A) with a buffering mechanism according to claim 17, wherein the buffering member (50) is arranged on an outer portion of the outer tube (14), and the buffering member (50) includes a cylindrical unit (51) and a shaft (52) penetrating into the cylindrical unit (51); one end of the cylindrical unit (51) away from the shaft (52) is secured onto the housing base (11) via a bolt (54), and one end of the shaft (52) away from the cylindrical unit (51) is connected to the extendable tube (15).

19. The linear actuator (1A) with a buffering mechanism according to claim 18, wherein the shaft (52) is connected to the extendable tube (15) via a connecting assembly (55); the connecting assembly (53) includes an elongated portion (551) and a fixation rod (553); the elongated portion (551) is connected to an end portion of the shaft (52); the extendable tube (15) includes a through hole (152) formed thereon; one end of the fixation rod (553) penetrates into and is secured inside the through hole (152).

20. The linear actuator (1A) with a buffering mechanism according to claim 19, wherein the elongated portion (551) includes a groove (552), another end of the fixation rod (553) is received inside the groove (552), and a length of the groove (552) is greater than an outer diameter of the another end of the fixation rod (553).

* * * * *